Aug. 23, 1960 A. BÄAB 2,949,836
DEPTH-OF-FIELD INDICATOR FOR PHOTOGRAPHIC OBJECTIVES
Filed Feb. 10, 1958

Inventor:
Albert BAAB
BY Karl F. Ross
AGENT

United States Patent Office 2,949,836
Patented Aug. 23, 1960

2,949,836

DEPTH-OF-FIELD INDICATOR FOR PHOTOGRAPHIC OBJECTIVES

Albert Bäab, Kreuznach, Rhineland, Germany, assignor to Jos. Schneider & Co., Optische Werke, Kreuznach, Rhineland, Germany, a corporation of Germany Filed Feb. 10, 1958, Ser. No. 714,251

Claims priority, application Germany Mar. 14, 1957

4 Claims. (Cl. 95—64)

My present invention relates to a device for indicating the depth of field (or depth of focus) of a photographic camera having means for adjusting the object distance of its objective and the aperture of its diaphragm.

Heretofore, indicators have been proposed for this purpose which comprise pointers or masking elements mounted for opposite rotary movement under the control of the diaphragm-adjusting means. Especially with objectives of large focal length, having correspondingly large axial dimensions, the necessary coaction between the focusing control and the diaphragm control for the setting of such indicators is not always easy to realize; moreover, the non-linear relationship between diaphragm stop and focusing range necessitates a relatively complex coupling mechanism.

The general object of my present invention is to provide an extremely simple depth-of-field indicator for camera objectives, particularly (but not exclusively) for those of considerable focal length.

A more specific object of my invention is to provide a device of this character having a single indicator member in contradistinction to the two oppositely moving members required in the earlier systems.

In accordance with this invention I provide in an objective housing a peripheral clearance of limited angular extent in which the indicator member, preferably in the shape of a cylinder segment, is axially movable in response to adjustments of the associated diaphragm control. The housing also has a window in the form of a narrow, transverse slot which extends adjacent the usual distance scale and overlies the indicator member which has a distinctively marked surface area of varying width viewable through a window. In a preferred embodiment the distinctive marking comprises a plurality of parallel, transverse strips of different lengths each individually alignable with the window in a corresponding axial position of the indicator member, the length of the strip denoting the depth of field on the adjacent distance scale.

The invention will be described in greater detail with reference to the accompanying drawing in which.

Figure 1:
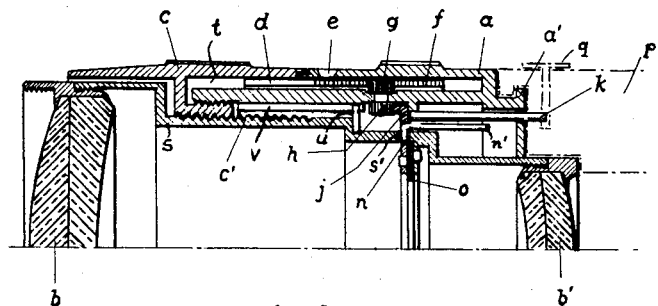
Fig. 1 is an axial half-section of an objective embodying the invention.

The objective shown in the drawing comprises the usual cylindrical housing $a$ having means $a'$, such as a bayonet coupling, for connecting it with a fixed part of a camera here indicated schematically at $p$. In the embodiment illustrated it has been assumed that the objective is one of the telephoto type and may be attached to the part $p$ interchangeably with one or more objectives of different focal length, e.g. a normal-view objective and a wide-angle objective, as is well known per se. Part $p$ may thus contain various elements which are common to the several exchange objectives adapted to be attached thereto, such as a shutter and one or more fixed lenses; these elements have not been illustrated, with the exception of a diaphragm-control ring $q$ which is the only such element of interest in connection with the present invention.

A lens barrel $s$ carries front and rear objective portions $b$, $b'$ and is threadedly engaged at $c'$ by a focusing ring $c$ rotatably mounted on housing $a$; rotation of the barrel $s$ is prevented by a radial pin $u$ playing in a longitudinal groove $v$ of the housing. The latter is formed, adjacent a focusing scale $c''$ carried on ring $c$, with an elongated window $e$ through which is visible an indicator member $d$ axially slidable, by means of a tenon $d''$, within a clearance $t$ defined by the housing $a$ and by the ring $c$.

Figure 3:
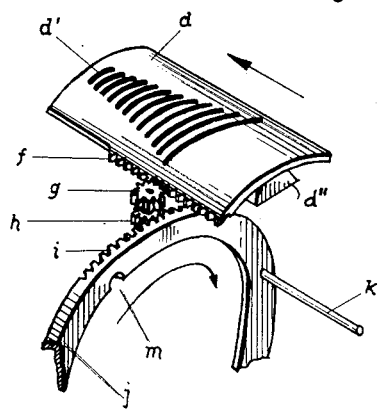
Fig. 3 is a perspective view of a depth-of-field indicator forming part of the objective of Figs. 1 and 2.

The indicator member $d$, as best seen in Fig. 3, has the form of a cylinder segment provided at one of its edges with rack teeth $f$ meshing with a pinion $g$. This pinion is rigid with a second pinion $h$ meshing with gear teeth $i$ of a ring $j$ from which a pin $k$ projects rearwardly out of housing $a$ and into engagement with a projection from diaphragm-control ring $q$. Ring $j$ also has an inner recess $m$ receiving an axially extending lug $n'$ which is rigid with another ring $n$, the latter serving for the setting of an iris diaphragm $o$ mounted in the lens barrel $s$.

Figure 2:
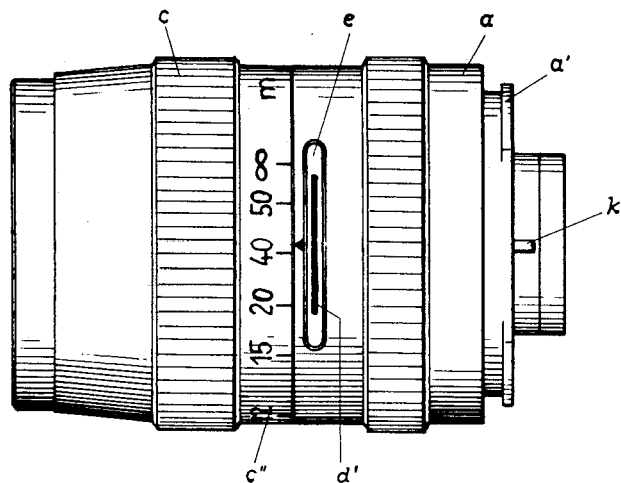
Fig. 2 is a top plan view of the objective.

An area on the upper (outer) surface of indicator member $d$ is marked by strips $d'$ of varying length which can be viewed, one at a time, through the window $e$ as best seen in Fig. 2. For any particular setting of ring $q$, corresponding to a desired diaphragm opening, the member $d$ will occupy a certain axial position in which the length of a visible strip $d'$ will indicate on scale $c''$ the depth of field with a given focusing adjustment selected by means of ring $c$. This positioning of member $d$ is brought about by the rotation of ring $j$ which, besides entraining the ring $n$ to change the diaphragm opening, also causes the pinion $h$ to rotate together with pinion $g$.

It will be understood that the separate strips $d'$ may also be replaced by a continuous, distinctively marked (e.g. colored) area of like outline and that, if desired, the diaphragm-control ring $q$ could be mounted directly on the objective and not on a separate part of the camera as shown. Moreover, means other than a slotted housing or envelope may be used to mask or obscure all but a narrow zone of the marked surface of indicator member $d$. These and other modifications will be readily apparent to persons skilled in the art and are intended to be embraced in the scope of the invention as defined in the appended claims.

I claim:

1. In a camera, in combination, an objective having a housing with a stationary annular portion and an axially adjoining rotatable annular portion, a lens barrel axially displaceable in said housing, diaphragm means in said lens barrel, focusing means including said rotatable portion operable to displace said lens barrel, control means for varying the effective aperture of said diaphragm means, said rotatable portion being externally provided with a peripherally extending distance scale in proximity to said stationary portion, said stationary portion being provided with a narrow, elongated window peripherally extending in proximity to said distance scale, an indicator member within said housing axially displaceable underneath said window, supporting means for said indicator member extending inwardly from said stationary portion, said indicator member having a surface provided with a distinctively marked area of varying width of which only a narrow zone is visible through said window in any position of said indicator member, and mechanism operatively coupling said control means with said indicator member for axially displacing same.

2. The combination according to claim 1 wherein said rotatable portion is provided with an inwardly extending flange threadedly engaging said lens barrel, said flange and said supporting means together forming a substantially closed annular chamber for said indicator member.

3. The combination according to claim 2 wherein a part of said chamber, formed by said supporting means, is of limited angular extent, said indicator member being in the form of a cylinder segment received in said part and projecting into a part of said chamber defined by said flange.

4. The combination according to claim 1 wherein said control means comprises a rotatable ring, said mechanism including rack teeth on said indicator member and pinion means entrained by said ring, said pinion means meshing with said rack teeth.

References Cited in the file of this patent

UNITED STATES PATENTS

| | | |
|---|---|---|
| 830,820 | Bausch | Sept. 11, 1906 |
| 1,076,694 | Oliver | Oct. 28, 1913 |
| 2,315,977 | Mihalyi | Apr. 6, 1943 |
| 2,319,083 | Nowack et al. | May 11, 1943 |